United States Patent
Kosugi et al.

(10) Patent No.: US 10,082,266 B2
(45) Date of Patent: Sep. 25, 2018

(54) VEHICLE LAMP

(71) Applicant: KOITO MANUFACTURING CO., LTD., Tokyo (JP)

(72) Inventors: Hiroki Kosugi, Shizuoka (JP); Michihiko Suzuki, Shizuoka (JP); Tetsuya Kataoka, Shizuoka (JP); Tamaaki Sugiura, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 340 days.

(21) Appl. No.: 14/391,098

(22) PCT Filed: Apr. 5, 2013

(86) PCT No.: PCT/JP2013/060497
§ 371 (c)(1),
(2) Date: Oct. 7, 2014

(87) PCT Pub. No.: WO2013/154052
PCT Pub. Date: Oct. 17, 2013

(65) Prior Publication Data
US 2015/0117047 A1    Apr. 30, 2015

(30) Foreign Application Priority Data
Apr. 9, 2012 (JP) ................................. 2012-088527

(51) Int. Cl.
*F21S 8/10* (2006.01)
*F21S 41/29* (2018.01)
(Continued)

(52) U.S. Cl.
CPC ........ *F21S 48/1208* (2013.01); *B29C 45/006* (2013.01); *F21S 41/29* (2018.01);
(Continued)

(58) Field of Classification Search
CPC ............... F21S 48/1233; F21S 48/2212; F21S 48/1208; F21S 48/145; F21S 8/00;
(Continued)

(56) References Cited

U.S. PATENT DOCUMENTS 5,083,244 A * 1/1992 Shirai et al. ................. 362/461
5,119,275 A * 6/1992 Makita .......................... 362/459
(Continued)

FOREIGN PATENT DOCUMENTS

CN    1602577 A    3/2005
CN    102077363 A    5/2011
(Continued)

OTHER PUBLICATIONS

Written Opinion (PCT/ISA/237) dated Jul. 2, 2013, in related International Application No. PCT/JP2013/060497.
(Continued)

*Primary Examiner* — Jong-Suk (James) Lee
*Assistant Examiner* — Mark Tsidulko
(74) *Attorney, Agent, or Firm* — Sughrue Mion, PLLC (57) ABSTRACT

A vehicle lamp 10 includes a lamp body 11, a sealing material 42, and a lens member 12 and a leg portion 41. A groove portion 31 is formed in the lamp body 11. The sealing material 42 is filled in the groove portion 31. The leg portion 41 is provided on the lens member 12. The leg portion 41 is inserted into the groove portion 31 to thereby fix the lamp body 11 and the lens member 12 together via the seal material 42. A narrow portion 51 is provided at a bottom side of the groove portion 31 and a wide portion 52 is provided at an opening 35 side of the groove portion 31. A gap of the wide portion 52 is wider than the gap of the narrow portion 51. The amount of sealing material 42 used in vehicle lamp 10 is limited while ensuring an easy assemblage.

8 Claims, 9 Drawing Sheets

(51) Int. Cl.
  *B29C 45/00* (2006.01)
  *F21S 45/50* (2018.01)
  *B29L 31/00* (2006.01)
  *B29C 65/00* (2006.01)
  *B29C 65/48* (2006.01)

(52) U.S. Cl.
  CPC ............. *F21S 45/50* (2018.01); *B29C 65/484* (2013.01); *B29C 66/028* (2013.01); *B29C 66/12463* (2013.01); *B29C 66/12469* (2013.01); *B29C 66/131* (2013.01); *B29C 66/322* (2013.01); *B29C 66/542* (2013.01); *B29L 2031/747* (2013.01)

(58) Field of Classification Search
  CPC . F21W 2131/401; F21L 4/00; F21V 23/0414; F21V 31/00
  USPC ................................ 362/520, 507, 267, 158
  See application file for complete search history.

(56) References Cited

U.S. PATENT DOCUMENTS

| | | | |
|---|---|---|---|
| 5,607,218 A * | 3/1997 | Choji | 362/548 |
| 6,669,351 B1 * | 12/2003 | Shea | B64F 1/20 362/153.1 |
| 6,811,285 B2 * | 11/2004 | Ferguson et al. | 362/267 |
| 7,186,363 B2 * | 3/2007 | Yabusaki | B29C 45/26 249/102 |
| 2004/0156672 A1 * | 8/2004 | Thomas | B63H 9/08 403/266 |
| 2004/0251749 A1 | 12/2004 | Hyun | |
| 2007/0241621 A1 | 10/2007 | Hyun | |
| 2009/0320907 A1 | 12/2009 | Botkin et al. | |
| 2012/0058349 A1 | 3/2012 | Wakamatsu | |
| 2012/0261364 A1 | 10/2012 | Botkin et al. | |
| 2014/0000187 A1 | 1/2014 | Botkin et al. | |

FOREIGN PATENT DOCUMENTS

| | | |
|---|---|---|
| JP | 63-150404 U | 10/1988 |
| JP | 5-068016 U | 9/1993 |
| JP | 09-282910 A | 10/1997 |
| JP | 2010-267578 A | 11/2010 |
| JP | 2012-54188 A | 3/2012 |

OTHER PUBLICATIONS

International Search Report (PCT/ISA/210), dated Jul. 2, 2013, in related International Application No. PCT/JP2013/060497.
Communication dated Dec. 12, 2017, issued by the Chinese Patent Office in counterpart Chinese application No. 201380019090.2.

* cited by examiner

VEHICLE LAMP

TECHNICAL FIELD

The present invention relates to a vehicle lamp.

BACKGROUND ART

Patent Document 1 or the like discloses a vehicle lamp having a lamp body, a lens member that is attached to the lamp body so as to close an opening in the lamp body, and a light source that is provided in an interior of the lamp body.

In the vehicle lamp, a seal material is filled in a groove portion that is provided along a circumferential edge of the opening of the lamp body, and thereafter, a leg portion that is provided along an outer circumference of the lens member is inserted into the groove portion, whereby the lamp body and the lens member are fixed together. In this way, the hermetic closure of the interior of the lamp body is ensured.

PRIOR ART DOCUMENT

Patent Document

Patent Document 1: JP-A-2010-267578

SUMMARY OF THE INVENTION

In general, an adhesive is used as the sealing material, and using a sealing material of a good performance increases the production cost. In particular, in the configuration described in Patent Document 1, since a communicating portion is provided in the groove portion and the leg portion for the sealing material and air to be brought into contact with each other, the sealing material enters the communicating portion, which increases the amount of sealing material used.

Then, an object of the invention is to provide a vehicle lamp that can reduce the amount of sealing material used to thereby reduce the production cost accordingly.

Means for Solving the Problem

With a view to solving the problem, according to the invention, there is provided a vehicle lamp in which a sealing material is filled in a groove portion provided in a lamp body, and a leg portion provided on a lens member is inserted into the groove portion to thereby fix the lamp body and the lens member together via the seal material.

The groove portion of the vehicle lamp includes a narrow portion which is provided at a bottom side of the groove portion and a wide portion, having a space wider than that of the narrow portion, which is provided at an opening side of the groove portion.

In the vehicle lamp of the invention, the sealing material may be a moisture-curable adhesive.

In the vehicle lamp of the invention, the narrow portion and the wide portion may be connected by an inclined portion that is inclined so as to reduce the width of the groove portion from the wide portion towards the narrow portion.

In the vehicle lamp of the invention, a groove depth at the narrow portion may be 3 mm or larger, and a gap between the leg portion and the narrow portion may be 0.1 mm or larger and 2.0 mm or smaller.

In the vehicle lamp of the invention, the sealing material may be filled in the gap between the narrow portion and the leg portion and may also be filled in part of a gap between the wide portion and the leg portion or part of a gap between the inclined portion and the leg portion.

Advantage of the Invention

According to the vehicle lamp according to the invention, the volume of the gap between the groove portion and the leg portion is reduced by the provision of the narrow portion in the groove portion to thereby reduce the amount of sealing material that is filled in the groove portion. Additionally, the insertion of the leg portion into the groove portion is facilitated, which facilitates the assemblage of the constituent parts by the provision of the wide portion at the opening side of the groove portion.

MODE FOR CARRYING OUT THE INVENTION

Hereinafter, embodiments of a vehicle lamp according to the invention will be described by reference to the drawings.

Figure 1:
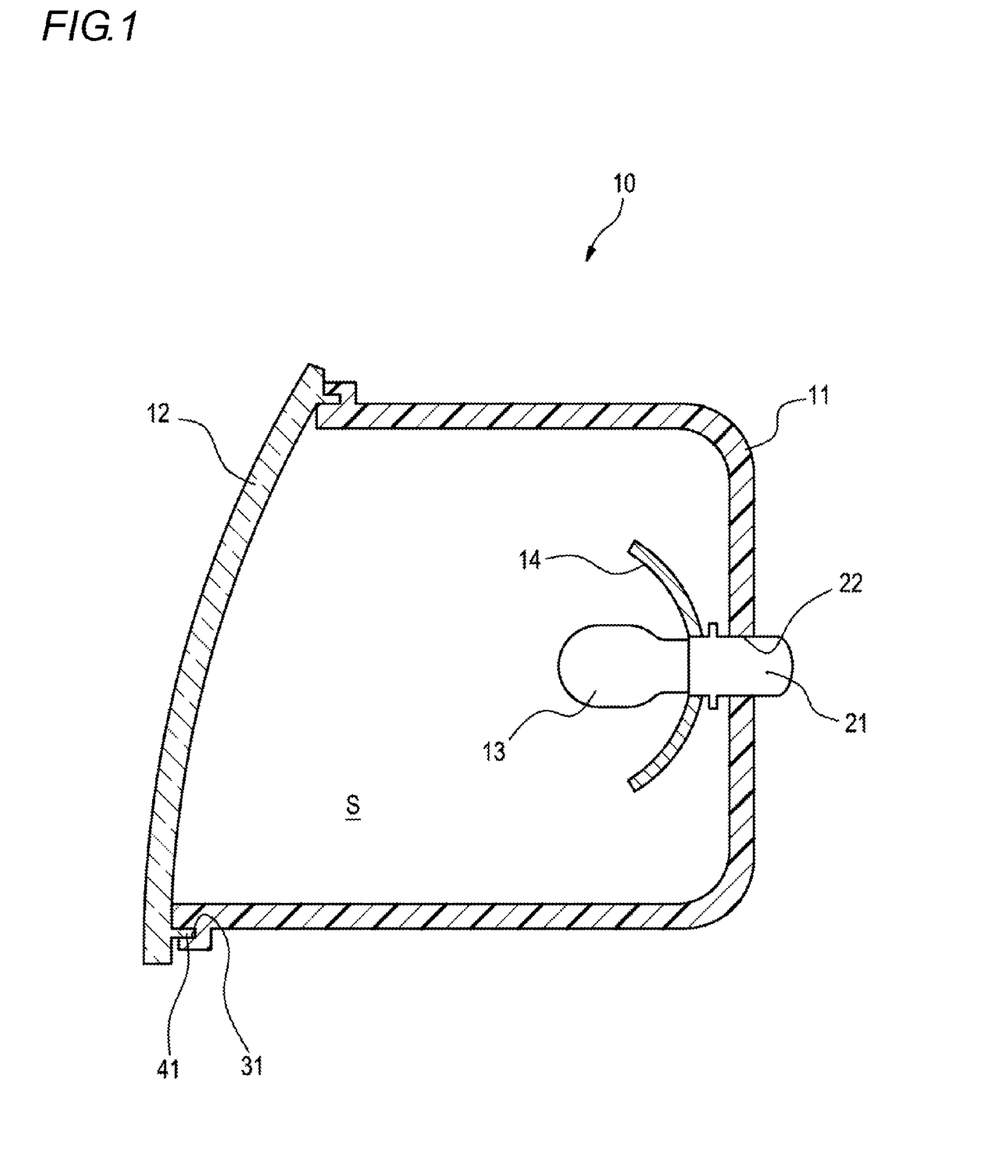
FIG. 1 is a sectional view of a vehicle lamp according to an embodiment of the invention.
Figure 2:
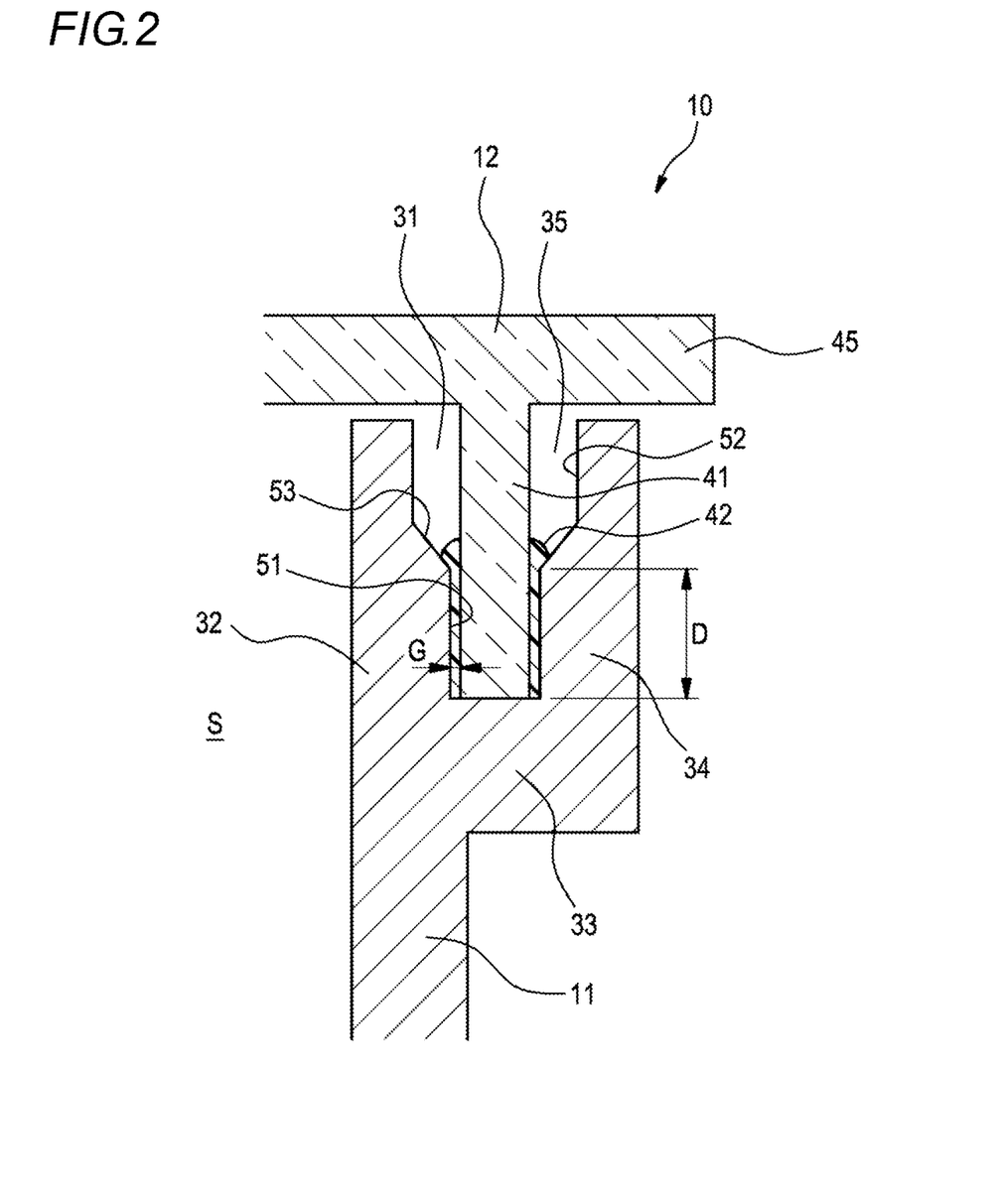
FIG. 2 is a sectional view of a portion where a lamp body and a lens member of the vehicle lamp are fixed together with an adhesive.

FIG. 1 is a sectional view of a vehicle lamp 10 according to an embodiment of the invention. FIG. 2 is a sectional view of a portion where a lamp body 11 and a lens member 12 of the vehicle lamp 10 are fixed together with an adhesive.

As shown in FIG. 1, the vehicle lamp 10 of this embodiment is a headlamp that is provided at a front portion of a vehicle to illuminate ahead of the vehicle. The vehicle lamp 10 includes a lamp body 11 which is opened at the front and a lens member 12 which is attached to the lamp body 11 so as to cover the opening of the lamp body 11. A hermetically closed lamp compartment S is formed in an interior of the vehicle lamp 10 by attaching the lens member 12 to the lamp body 11. A light source 13 and a reflector 14 are disposed in the lamp compartment S. The light source 13 is disposed substantially in the center of the lamp compartment S, and the reflector 14 is disposed at the rear of the light source 13.

The lamp body 11 and the lens member 12 are fixed to each other at their circumferential edge portions.

In this embodiment, "front" means a direction directed from the light source 13 towards the lens member 12 in the vehicle lamp 10 (a leftward direction in FIG. 1), and "rear" means a direction opposite to the front (a rightward direction in FIG. 1).

The lamp body 11 is formed integrally from a synthetic resin material, for example. For example, a polycarbonate resin (a PC resin), a polycarbonate ABS resin (a PC-ABS resin), an acrylic resin (a PMMA) are preferably used as the synthetic resin material. The lens material 12 is formed from, for example, a transparent or translucent synthetic resin material. For example, a polycarbonate resin (a PC resin), a polycarbonate ABS resin (a PC-ABS resin), an acrylic resin (a PMMA) are preferably used as the synthetic resin material.

The lens member 12 is an outer cover that transmits light. Lens steps may be provided on a surface of the lens member 12 that covers the opening in the lamp body 11 so as to collect or diffuse light from the light source 13.

The light source 13 is disposed within the lamp compartment S that is defined by the lamp body 11 and the lens member 12. This light source 13 is electrically connected to a socket portion 21 that is fixed to the lamp body 11 and emits light by using electric power supplied from a power supply (not shown) via the socket portion 21. The reflector 14 has a concave surface that is depressed into a substantially paraboloidal shape, and the paraboloidal surface is oriented to the front. A though hole 22 is provided in the center of the concave surface for the light source 13 to be inserted therethrough. The reflector 14 is disposed at the rear of the light source 13 in the lamp compartment S so as to reflect light from the light source 13 to the front (towards the lens member 12).

A groove portion 31 is formed in the outer circumferential edge portion of the lamp body 11 along the full circumference thereof. As shown in FIG. 2, the groove portion 31 is made up of a bottom wall 33 that projects to extend sideways from a main body portion 32 of the lamp body 11 and a side wall 34 that rises to the front from one end of the bottom wall 33. Additionally, the groove portion 31 has an opening 35 at a front side thereof.

A leg portion 41 is provided at the outer circumferential edge portion of the lens member 12 so as to project to the rear. This leg portion 41 is inserted into the groove portion 31 that is now filled with a sealing material 42 that is an adhesive, and the leg portion 41 is fixed to the groove portion 31 via the sealing material 42. A moisture-curable adhesive, a heat-curable adhesive, an ultraviolet radiation-curable adhesive and the like can be used as the sealing material 42. The moisture-curable adhesive is particularly preferable among the adhesives raised. The groove portion 31 of the lamp body 11 and the leg portion 41 of the lens member 12 are fixed together via the sealing material 42 in the way described above, thereby making it possible to ensure a hermetically sealed environment in an interior of the lamp compartment S while shielding the lamp compartment S from what attempts to intrude thereinto from the outside.

A narrow portion 51 is formed on the groove portion 31. The narrow portion 51 faces the bottom wall 33 of the groove portion 31. A wide portion 52 is formed on the groove portion 31. The wide portion 52 faces the opening 35 of the groove portion 31. The gap of the wide portion 52 in a horizontal direction of the sectional view shown in FIG. 2 is wider than the gap of the narrow portion 51. In other words, the gap between the main body portion 32 and the side wall 34 in the wide portion 52 is wider than the gap between the main body portion 32 and the side wall 34 in the narrow portion 51. The narrow portion 51 of the groove portion 31 is formed by thickening the thickness of the main body portion 32 and the side wall 34. Then, the sealing material 42 that is filled in the groove portion 31 fills a gap between the narrow portion 51 and the leg portion 41 while filling part of a gap between the wide portion 52 and the leg portion 41. It is preferable that the width of the narrow portion 51 in the horizontal direction of the sectional view shown in FIG. 2 is set so that the leg portion 41 is spaced away from the narrow portion 51 with a slight gap defined therebetween then the leg portion 41 is inserted into the narrow portion 51.

Additionally, an inclined portion 53 is provided between the wide portion 52 and the narrow portion 51. This inclined portion 52 is inclined so as to reduce the width of the groove portion 31 from the wide portion 52 towards the narrow portion 51, and the wide portion 52 is connected to the narrow portion 51 by this inclined portion 53.

Here, a groove depth D of the narrow portion 51 of the groove portion 31 is 3 mm or larger. Additionally, a width of at least one of gaps G defined between the leg portion 41 of the lens member 12 that is inserted into the groove portion 31 and the narrow portion 51 is 0.1 mm or larger and 2.0 mm or smaller.

A flange 45 is formed at the outer circumferential edge portion of the lens member 12 so as to project sideways. When inserting the leg portion 41 of the lens member 12 into the groove portion 31 of the lamp body 11, this flange portion 45 is brought into abutment with or is caused to approach closely an upper end off the side wall 34 of the groove portion 31. By doing so, an insertion length of the leg portion 41 into the groove portion 31 is restricted, whereby the lens member 12 is positioned in a front-to-rear direction with respect to the lamp body 11.

Figure 3:
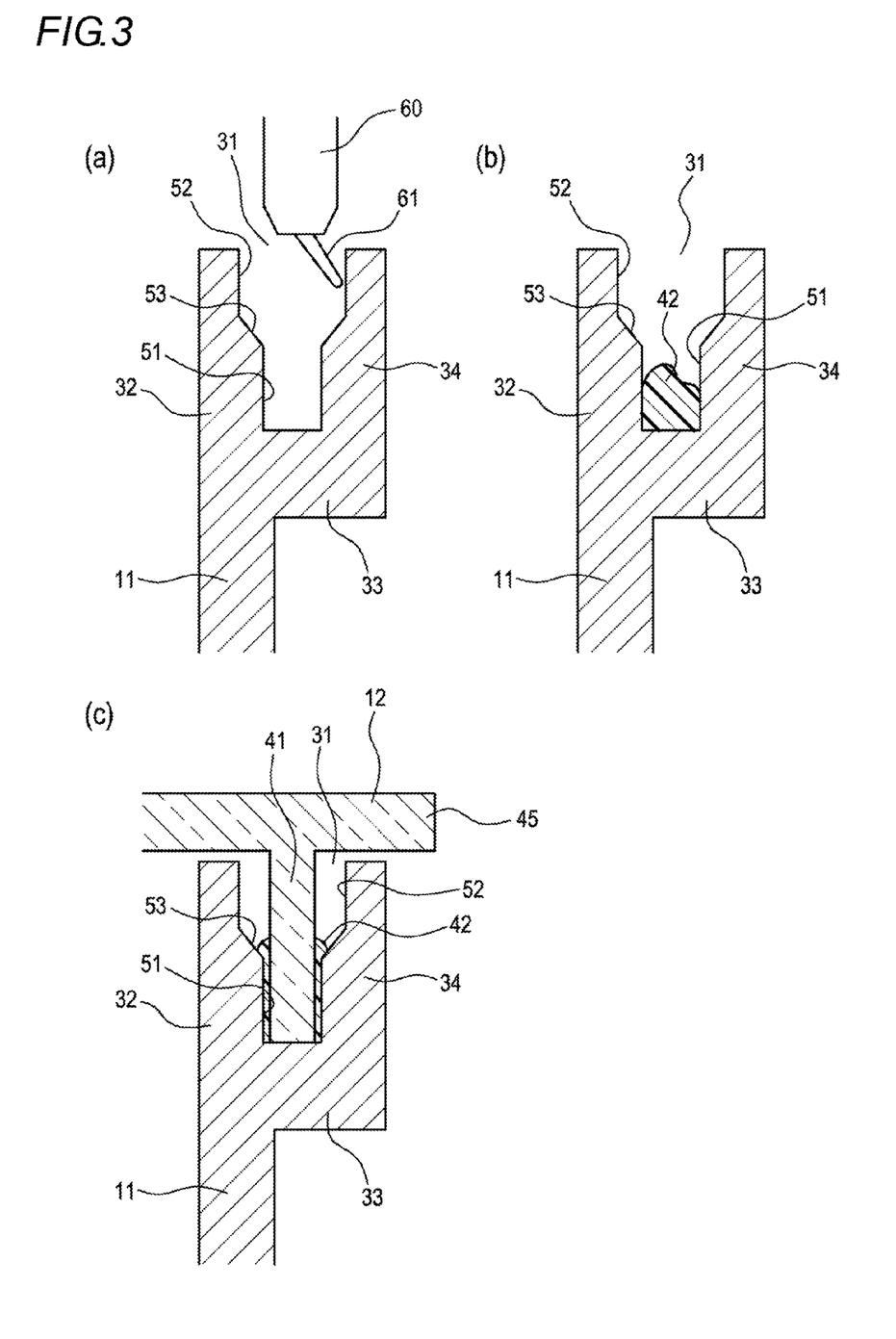
FIG. 3 shows at (a) to (c) sectional views of the portion where the lamp body and the lens member of the vehicle lamp are fixed together with the adhesive, illustrating an assemblage of the lens member to the lamp body.

Next, referring to FIG. 3, an assembling process of the lens member 12 to the lamp body 11 will be described. FIG. 3 illustrates assembling work of the lens member 12 to the lamp body 11 and shows at (a) to (c) sectional views of a portion where the lens member 12 is fixed to the lamp body 11 with an adhesive.

(Sealing Material Filling Process)

As shown at (a) in FIG. 3, firstly, plasma gas is injected from a nozzle 61 of a plasma injector 60 towards the groove portion 31 of the lamp body 11 that is filled with the sealing material 42. By injecting the plasma gas into the groove portion 31 in advance in this way, it is possible to enhance the bonding strength of the sealing material 42 that is made up of a moisture-curable adhesive to the groove portion 31. As this occurs, since the groove portion 31 is opened wide at the wide portion 52, the insertion of the nozzle 61 into the groove portion 31 is facilitated. This facilitates the injection of plasma gas into the groove portion 31.

Next, as shown at (b) in FIG. 3, a predetermined amount of sealing material 42, which is the moisture-curable adhesive, is injected into the groove portion 31 after the plasma gas has been injected into the groove portion 31. As this occurs, since the groove portion 31 is opened wide at the wide portion 52, the injection of the sealing material 42 is facilitated.

(Lens Member Assembling Process)

Further, as shown at (c) in FIG. 3, the lens member 12 is moved closely to the lamp body 11, so that the leg portion 41 of the lens member 12 is inserted into the groove portion 31 of the lamp body 11. Then, the sealing material 42 within the groove portion 31 is displaced to the side of the groove portion 31 that faces the opening portion 35 by the leg portion 41 that is inserted into the groove portion 31, whereby the sealing material 42 enters between the narrow portion 51 of the groove portion 31 and the leg portion 41 uniformly.

Here, the injection amount of the sealing material 42 is controlled so that the sealing material 42 fills the gaps between the narrow portion 51 and the leg portion 41 when the leg portion 41 is inserted into the groove portion 31. Additionally, the injection amount of the sealing material 42 may be controlled so that part of the sealing material 42 enters the gaps between the wide portion 52 and the leg portion 41 as shown at (c) in FIG. 3. By doing so, even though the injection amount of the sealing material 42 varies, the gaps between the narrow portion 51 and the leg portion 41 can be filled with the sealing material sufficiently.

Here, the wide portion 52 is formed at the side of the groove portion 31 that lies to face the opening 35 or the side of the groove portion 31 that constitutes an entrance side where the leg portion 41 is inserted, and the gaps defined between the wide portion 52 and the leg portion 41 that is inserted thereinto become wide. Therefore, the leg portion 41 is inserted easily into the groove portion 31. In addition, the leg portion 41 that is inserted into the wide portion 52 is smoothly guided into the narrow portion 51 by the inclined portion 53 that connects the wide portion 52 to the narrow portion 51. This facilitates the insertion of the leg portion 41 into the narrow portion 51 that is narrow in width.

In addition, when inserting the leg portion 41 into the groove portion 31, the flange 45 of the lens member 12 is brought into abutment with or is caused to approach closely a front end of the side wall 34 of the groove portion 41, whereby the insertion of the leg portion 41 into the groove portion 31 is restricted. By doing so, the leg portion 41 can be inserted into a predetermined position in the groove portion 31 accurately, this facilitating the positioning of the lens member 12 with respect to the lamp body 11.

Additionally, the width of the space defined in the narrow portion 51 is set so that the leg portion 41 is spaced away from the narrow portion 51 with the slight gap defined therebetween. Because of this, when the leg portion 41 is inserted into the groove portion 31, the leg portion 41 is held by the narrow portion 51 of the groove portion 31. This enables the lens member 12 to be held in a predetermined posture relative to the lamp body 11.

(Sealing Material Curing Process)

When the leg portion 41 is inserted into the groove portion 31 with the lens member 12 assembled to the lamp body 11 in the predetermined posture, the lens member 12 is held in the predetermined posture for a predetermined period of time. This allows the sealing material 42, which is the moisture-curable adhesive, to be cured, whereby the lens member 12 can be fixed to the lamp body 11. As this occurs, the leg portion 41 that is inserted into the groove portion 31 is held in the predetermined posture by the narrow portion 51 of the groove portion 31. Consequently, even though a long period of time is required for the sealing material 42 to be cured, the lens member 12 can be fixed to the lamp body 11 without deviation of the position and posture of the lens member 12 relative to the lamp body 11 from the predetermined ones. Additionally, when the moisture-curable adhesive is used as the sealing material 42, the sealing material 42 can be cured without using exclusive equipment.

The series of operations described above allows the assemblage of the lens member 12 to the lamp body 11.

Thus, as has been described heretofore, according to the vehicle lamp 10 according to this embodiment, by providing the narrow portion 51 in the groove portion 31, the volume of the gap between the groove portion 31 and the leg portion 41 can be reduced to as low a level as possible, thereby making it possible to reduce the injection amount of the sealing material 42 that is injected into the groove portion 31. Consequently, it is possible to provide the vehicle lamp 10 that can restrict the amount of sealing material 42 used to thereby reduce the production cost.

Here, the strength at the bonding portion where the lens member 12 is bonded to the lamp body 11 is affected by the strength of the sealing member 42 when the thickness of a layer of sealing material 42 injected is thick and is affected by the strength of the lamp body 11 and the lens member 12 which are bonded together when the thickness of the layer of sealing material 42 injected is thin. In particular, the thinner the thickness of the layer of sealing material 42, the larger the strength becomes, and a required strength is reached quickly. In this embodiment, the filling space of the sealing material 42 is narrowed by the narrow portion 51, reducing the thickness of the layer of sealing material 42, and therefore, the bonding strength is enhanced. Additionally, since the required strength is reached quickly, a length of time required for assemblage of a vehicle lamp can be shortened.

Not only can the amount of sealing material 42 injected be reduced by the narrow portion 51, but also the insertion of the leg portion 41 into the groove portion 31 can be facilitated by the provision of the wide portion 52 at the side of the groove portion 31 facing the opening 35, whereby the ease of the assemblage is ensured. Moreover, the leg portion 41 that is inserted into the groove portion 31 can be held in the predetermined posture by the narrow portion 51 of the groove portion 31.

In particular, a large bonding area can be ensured by setting the groove depth D of the narrow portion 51 to 3 mm or larger. Since the bonding force increases with bonding area, a required bonding force to fix the lens member 12 to the lamp body 11 can be ensured sufficiently.

Moreover, the gap G between the leg portion 41 and the narrow portion 51 is set to 0.1 mm or larger and 2.0 mm or smaller. Because of this, a sufficient bonding force can be obtained by the sealing material 42 while ensuring the smooth insertion of the leg portion 41 into the narrow portion 51. Further, the curing speed of the sealing material 42 can be enhanced so as to reduce the production cost.

It is noted that in case the gap G between the leg portion 41 and the narrow portion 51 is smaller than 0.1 mm, it becomes difficult for the leg portion 41 to be inserted into the narrow portion 51. On the other hand, in case the gap G between the leg portion 41 and the narrow portion 51 is larger than 2.0 mm, the gap becomes too wide, and the bonding force by the sealing material 42 is reduced, and the curing time of the sealing material 42 is extended, increasing the production cost.

Here, the filling or injection amount of sealing material 42 is basically determined based on the gap G between the narrow portion 51 and the leg portion 41. According to the invention, however, even though the sealing material 42 is injected more than the predetermined amount, the sealing material 42 can stay in the gaps defined between the wide portion 52 and the leg portion 41, and hence, there is no such situation in which the sealing material 42 overflows the groove portion 31.

Namely, according to the construction of this embodiment, the sealing material 42 that is poured into the gaps G between the narrow portion 51 and the leg portion 41 also fills part of the gaps between the wide portion 52 and the leg portion 41. Because of this, the level of the sealing material 42 that is poured into the narrow portion 51 can be restricted from rising by the wide portion 52, thereby eliminating a problem that the sealing material 42 flows over the brim of the groove portion 31.

Additionally, in the case of the moisture-curable adhesive being used as the sealing material 42, the viscosity of the moisture-curable adhesive is lower than that of a heat-curable adhesive. This makes it difficult for air bubbles to enter the narrow portion 51 together with the sealing material 42 when the sealing material 42 is poured into the narrow portion 51, whereby the lens member 12 can be bonded to the lamp body 11 in an ensured fashion. In addition, in the case of a heat-curable adhesive or an ultraviolet radiation-curable adhesive being used as the sealing member, separate equipment such as a curing oven where the sealing material is cured or an ultraviolet radiation emitting device for curing the ultraviolet radiation-curable adhesive is necessary. However, in the case of the moisture-curable adhesive being used as the sealing material 42, the equipment described above is unnecessary. This can reduce the equipment cost and the production cost.

In addition, the inclined portion 53 is provided which is inclined so as to reduce the width of the groove portion 31 from the wide portion 52 to the narrow portion 51. By adopting this configuration, when inserting the leg portion 41 from the opening 35 of the groove portion 31 towards the bottom wall 33 thereof, the leg portion 41 is guided by the inclined portion 53 that is inclined from the wide portion 52 towards the narrow portion 51. This allows the leg portion 41 to be inserted smoothly into the groove portion 31, thereby enhancing the assemblage efficiency.

In this embodiment, while the narrow portion 51 of the groove portion 31 is formed by thickening the thicknesses of both the main body portion 32 and the side wall 34 of the lamp body 11, the narrow portion 51 may be formed by thickening the thickness of either of the main body portion 32 and the side wall portion 34.

Figure 4:
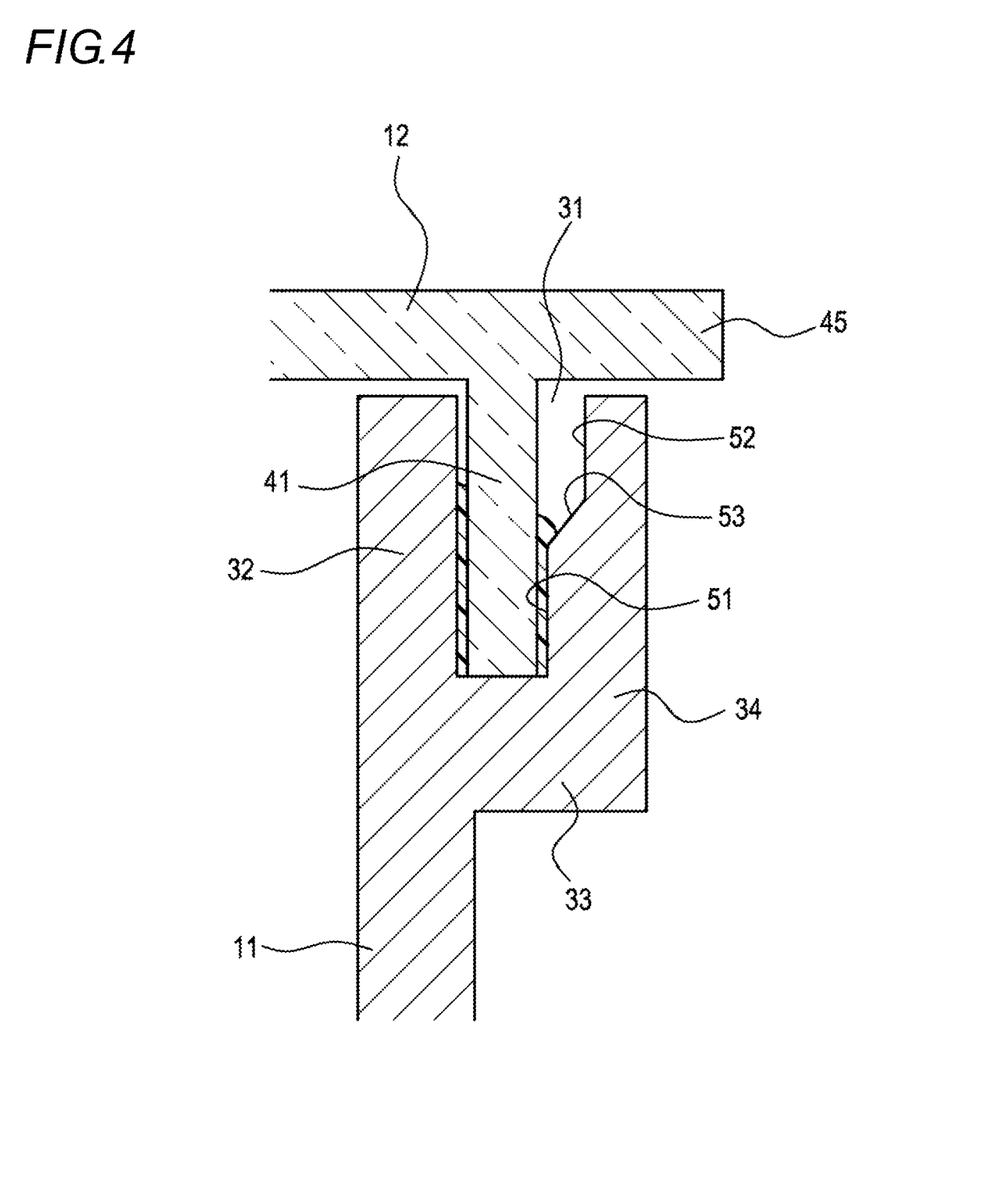
FIG. 4 is a sectional view of a portion where a lamp body and a lens member of a vehicle lamp are fixed together with an adhesive according to a modified example of the invention.

FIG. 4 is a sectional view of a portion where a lamp body 11 and a lens member 12 of a vehicle lamp 10 according to a modified example are fixed with an adhesive. As shown in FIG. 4, a narrow portion 51 may be formed in a groove portion 31 by thickening the thickness of a portion of a side wall portion 34 that lies to face a bottom wall 33, and a side of the groove portion 31 that lies to face a main body portion 32 may be formed into a flat plane along the full depth of the groove portion 31. In this case, too, the volume of a gap between the groove portion 31 and a leg portion 41 is reduced to as low a level as possible, whereby the amount of sealing material 42 that is poured into the groove portion 31 is reduced. Thus, it is possible to provide the vehicle lamp 10 that can restrict the amount of sealing material 42 used to thereby reduce the production cost.

In the embodiment, while the narrow portion 51 is described as being provided along the full circumference of the groove portion 31 of the lamp body 11, the narrow portion 51 may be formed at a portion along the circumference of the groove portion 31 of the lamp body 11. In particular, when the narrow portion 51 is provided at a location where the seal material 42 flows easily, the flow of the sealing material 42 can preferably restricted.

In addition, it is preferable that the surface roughness of the narrow portion 51 is larger than that of the wide portion 52 in the groove portion 31. For example, for a surface roughness Ra (a center line average roughness) of each of the narrow and wide portions, 10 nm to 1000 nm is preferable at the narrow portion 51. For example, the surface roughness of the narrow portion 51 can be increased by injecting plasma gas as described above. Alternatively, a narrow portion 51 having large surface roughness can be formed by transferring micro irregularities provided on a mold to a portion where a narrow portion 51 is to be formed when a lamp body 11 is injection molded from a resin.

Figure 5:
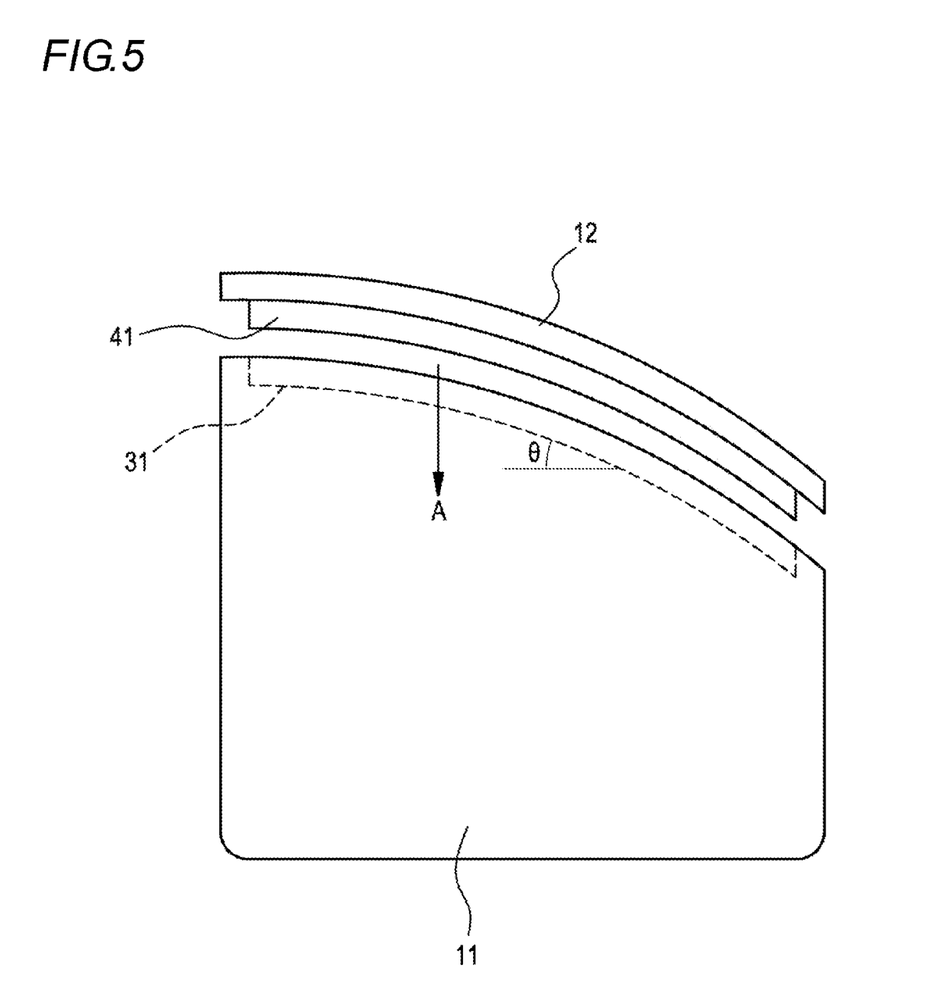
FIG. 5 is a schematic side view of the lamp body and the lens member which illustrates a flow of a sealing material within a groove portion.

FIG. 5 is a schematic side view of the lamp body 11 and the lens member 12 which illustrates the flow of the sealing material 42 within the groove portion. As shown in FIG. 5, in assembling the lens member 12 to the lamp body 11 along an assembling direction A, there may be occurring a situation in which the groove portion 31 of the lamp body 11 is inclined relative to a plane that intersects the assembling direction A at right angles. As this occurs, in case the inclination angle θ of the groove portion 31 is large, there are fears that the sealing material 42 that is poured into the groove portion 31 flows downwards. Even though this occurs, in case the surface roughness Ra of the narrow portion 51 is increased in advance, it is possible to restrict the flow of the sealing material 42. By doing so, the lens member 12 can be bonded to the lamp body 11 well, thereby making it possible to eliminate a bonding failure or an external appearance failure due to flowing out of the sealing material 42.

Figure 6:
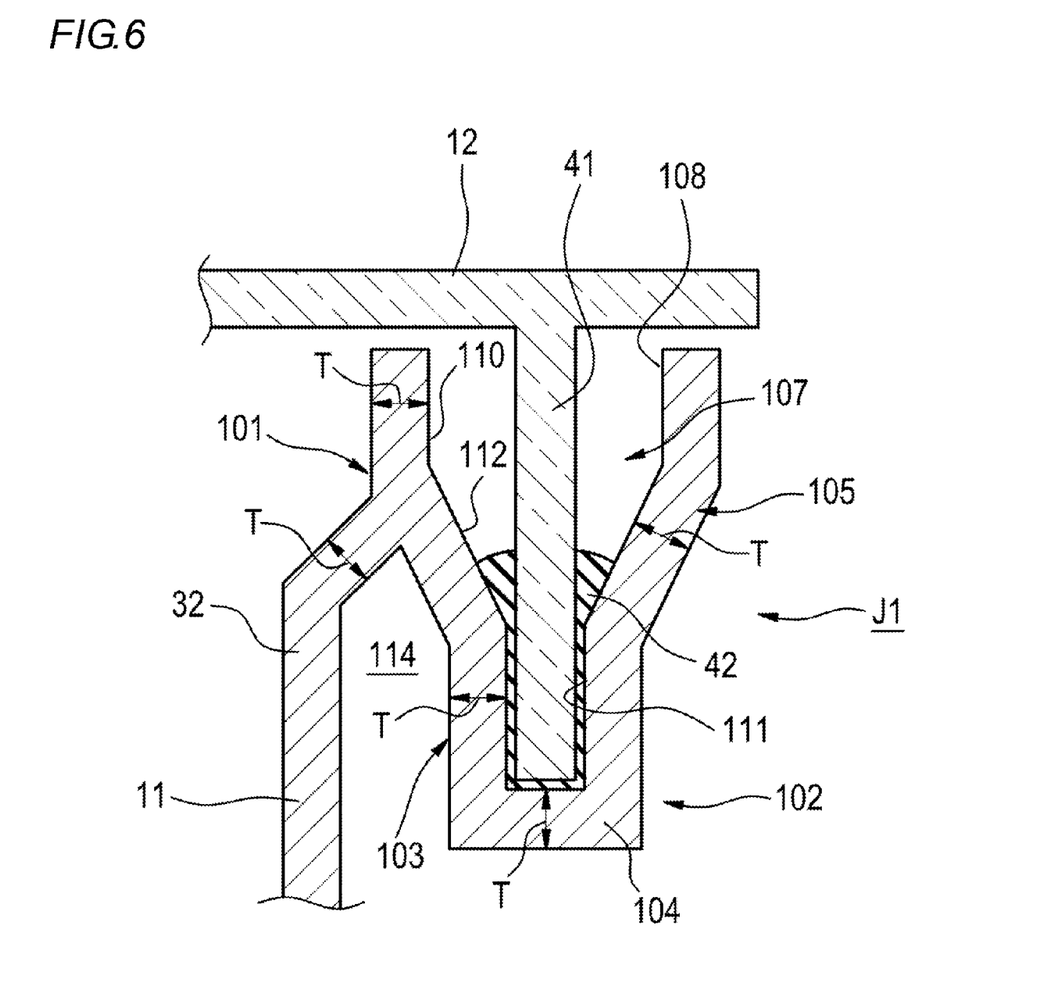
FIG. 6 is an enlarged sectional view of a portion where a lamp body and a lens member are fixed together with an adhesive according to another embodiment of the invention.

Further, in the invention, it is possible to adopt a configuration shown in FIG. 6. FIG. 6 is an enlarged sectional view of a portion J1 where a lamp body 11 and a lens member 12 are fixed together with an adhesive according to another embodiment of the invention. This adhesive fixing portion J1 is configured so that a leg portion 41 of the lens member 12 is joined to a flange portion 102 that is provided along the full circumference of an outer circumferential edge portion 101 of the lamp body 11 with a sealing material 42. The flange portion 102 projects from a main body portion 32 of the lamp body 11 to an outside of a vehicle lamp and includes an inner side wall portion 103 that extends from the main body portion 32 to the rear of the lamp, a bottom wall portion 104 that extends from a distal end of the inner side wall portion 103 in a direction that intersects a front-to-rear diction of the lamp at substantially right angles, and an outer side wall portion 105 that extends from a distal end of the bottom wall portion 104 to the front of the lamp. Here, the front of the lamp means a direction in which light is emitted from the lamp. A space between the inner side wall portion 103 and the outer side wall portion 105 is formed as a groove portion 107 that receives the leg portion 41 of the lens member 12. A side of the groove portion 107 that lies at the front of the lamp is made into an opening 108 from which the leg portion 41 is inserted. Further, the groove portion 107 includes a wide portion 110 having a large width dimension and formed at a side of the groove portion 107 that faces the opening 108, a narrow portion 111 having a small width dimension and formed at a side of the groove portion 107 that faces the bottom wall portion 104, and an inclined portion 112 whose width dimension is gradually reduced from the wide portion 110 to the narrow portion 111. In addition, the flange portion 102 is formed so that a thickness dimension thereof is substantially uniform. Namely, thickness dimensions T of the inner side wall portion 103, the bottom wall portion 104 and the outer side wall portion 105 are substantially the same as a thickness dimension of the outer circumferential edge portion 101 of the lamp body 11. To realize this configuration, a portion between the main body portion 32 of the lamp body 11 and a portion of the inner side wall portion 103 that forms the narrow portion 111 is formed as a space portion 114 where no resin is injected.

In the embodiment shown in FIG. 6, the thicknesses T of the outer circumferential edge portion 101 and the flange portion 102 of the lamp body 11 are set to the substantially constant dimension. In general, in the injection molding, the resin tends to flow easily at the thick portion, and there may be occurring a phenomenon in which the resin starts to flow in along the thick portion earlier than other portions. When this phenomenon occurs, gas is sealed in portions where the resin flows in later, which increases the temperature in the portions where the gas is so sealed, leading to a concern that a failure referred to as a "gas burn mark" is caused. In particular, when a molded product such as a lamp body 11 is injection molded, it is general practice to pour a resin from a central portion towards an outer circumferential edge portion 101 of a lamp body 11 to be injection molded. Then, in case a thick portion exists in the outer circumferential edge portion 101, the "gas burn mark" attributed to the difference in speed at which the resin flows tends to be generated easily. In contrast with this, in this embodiment, the thicknesses T of the outer circumferential edge portion 101 and the flange portion 102 of the lamp body 11 are set to the substantially constant dimension, and hence, there is caused no different in speed at which the resin flows. Therefore, it is possible to pour the resin in a stable fashion. This prevents the occurrence of failures like those mentioned above in injection molding the lamp body 11, thereby making it possible to enhance the injection molding quality.

Figure 7:
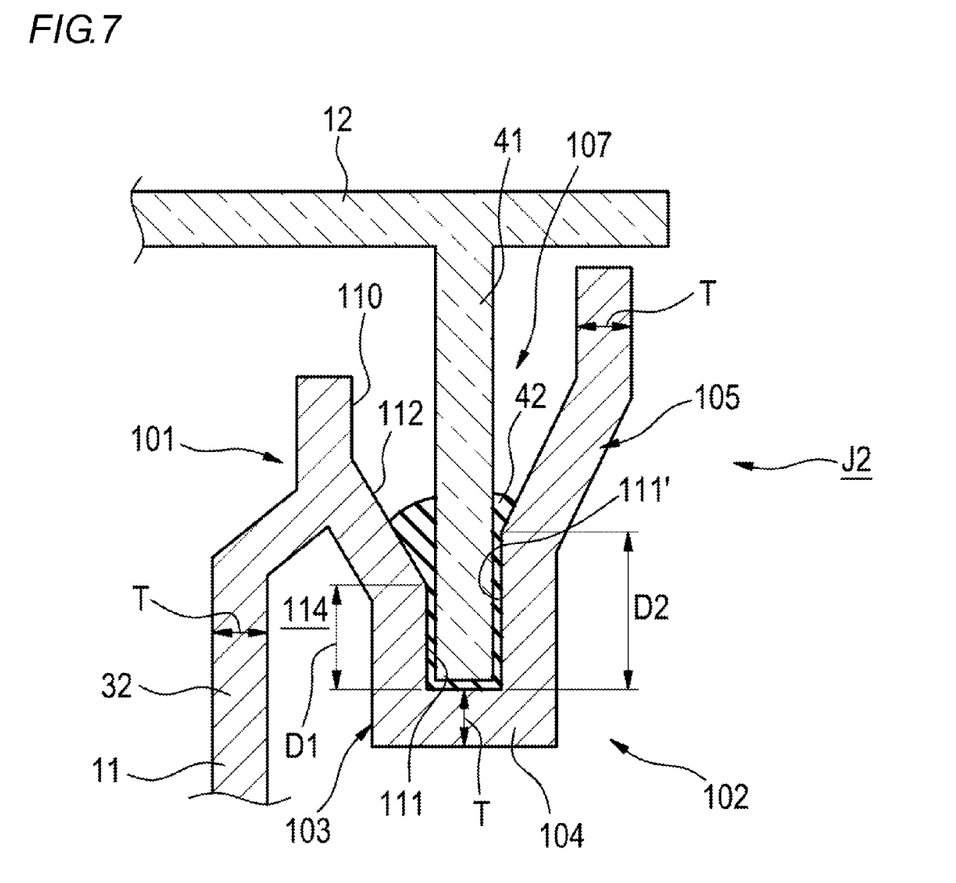
FIG. 7 is an enlarged sectional view of a portion where a lamp body and a lens member are fixed together with an adhesive according to a further embodiment of the invention.

Further, in this invention, a further embodiment shown in FIG. 7 may be adopted. In FIG. 7, like reference numerals are given to like constituent element to those in FIG. 6, and the description thereof will be omitted. Although the construction of an adhesive fixing portion J2 shown in FIG. 7 where a lamp body 11 and a lens member 12 are fixed together with an adhesive is basically similar to that of the adhesive fixing portion J1 shown in FIG. 6, the adhesive fixing portion J2 differs from the adhesive fixing portion J1 in that a height dimension D1 of a narrow portion 111 that lies to face an inner side wall portion 103 of a flange portion 102 is formed to be smaller than a height dimension D2 of a narrow portion 111' that lies to face an outer side wall portion 105. Specifically speaking, the height dimensions D1 and D2 are set to something like a ratio of D1:D2=1:1.5 or so that the ratio of D1 to D2 becomes smaller than that ratio.

Figure 8:
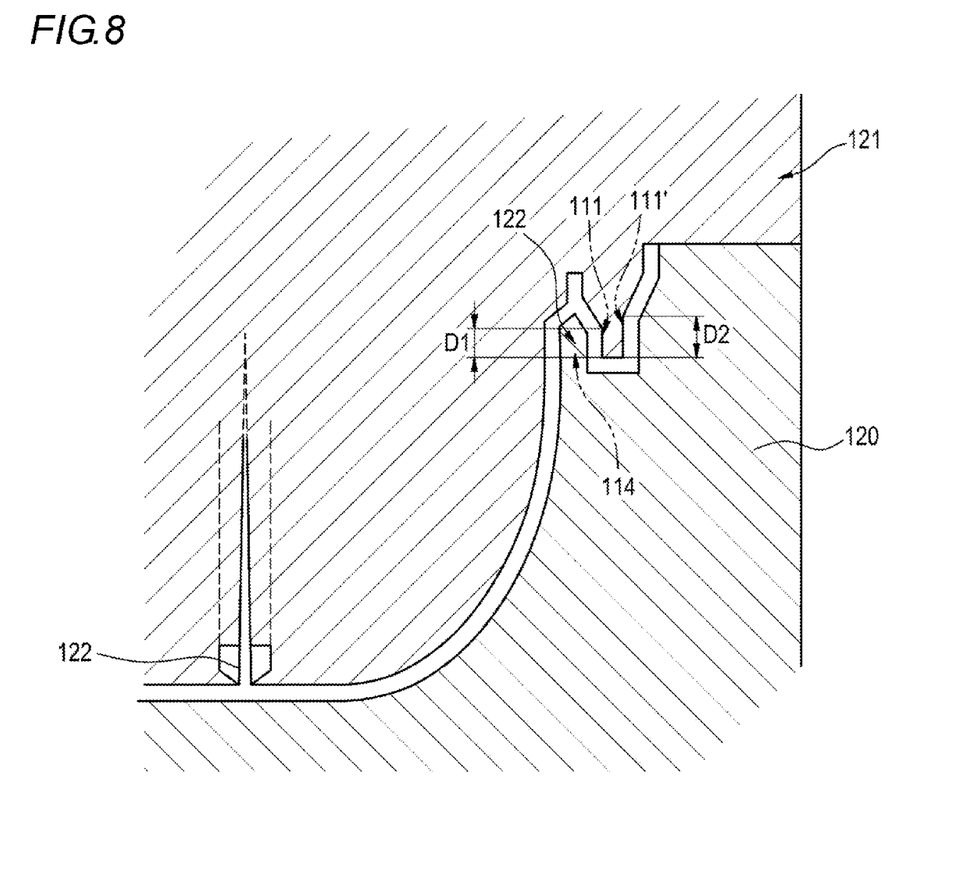
FIG. 8 is a sectional view showing an example of a configuration of a mold for injection molding the lamp body shown in FIG. 7.

When this configuration is adopted, as will be described below, it is possible to improve the strength of a mold for use in injection molding the lamp body 11. FIG. 8 shows an example of a mold for use in injection molding the lamp body 11 shown in FIG. 7. The mold for use in injection molding the lamp body 11 includes a cavity 120 and a core 121. The cavity 120 is pressed against the core 121, and a resin is injected from an injection gate 122 that is formed in the core 121 into a space defined between the cavity 120 and the core 121 to thereby form the lamp body 11. Here, as shown in FIG. 7, the thickness of the flange portion 102 of the lamp body 11 is set to the constant dimension T, and therefore, the space portion 114 where no resin is poured needs to be formed between the main body portion 32 of the lamp body 11 and the portion of the inner side wall portion 103 that forms the narrow portion 111. However, in order to form this space portion 114, as shown in FIG. 8, a projection 122 is formed at a location on the cavity 120 that corresponds to the space portion 114. Here, in case a projecting dimension of the projection 122 from the cavity 120 becomes large, the strength of the projection 122 is reduced, and the repeated utilization of the mold tends to result in a failure of the projection 122. In contrast with this, in the embodiment, the height dimension D1 of the narrow portion 111 that faces the inner side wall portion 103 is formed relatively smaller than the height dimension D2 of the narrow portion 111' that faces the outer side wall portion 105 of the flange portion 102. Therefore, it is possible to restrict the increase in height dimension of the projection 122. Thus, it is possible to ensure the strength of the mold.

Figure 9:
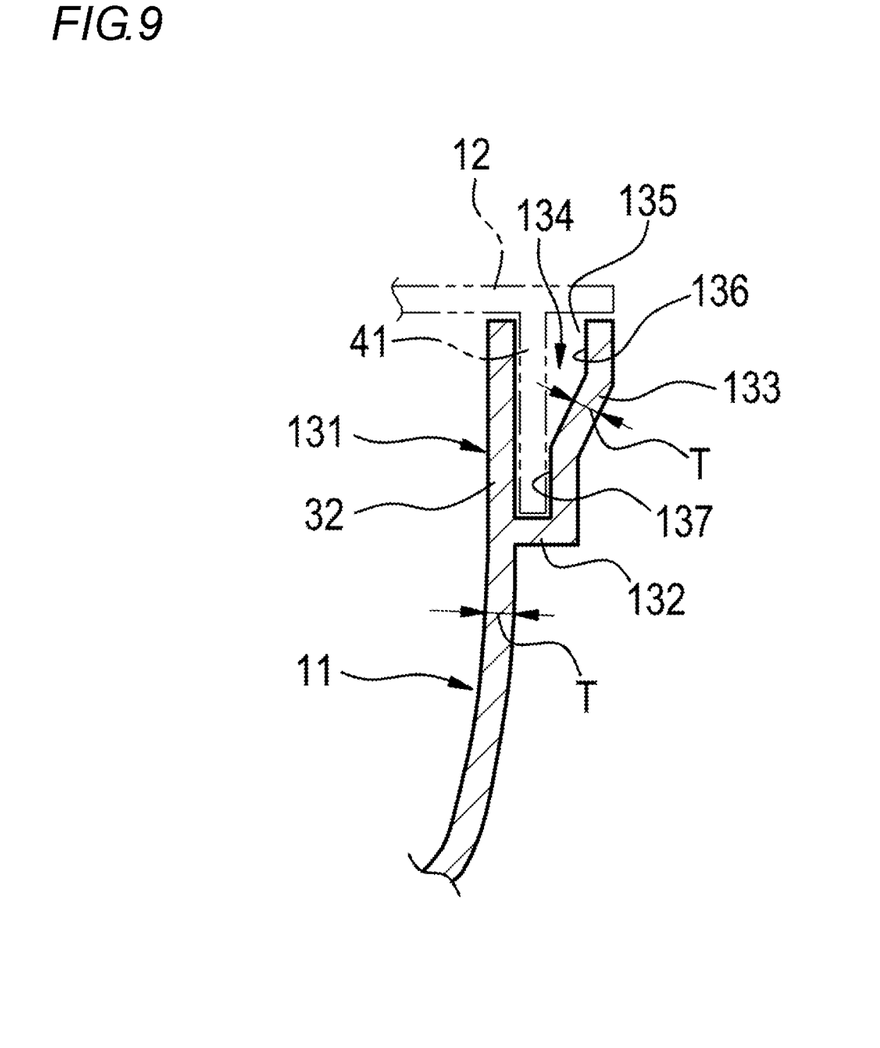
FIG. 9 is a sectional view showing an outer circumferential edge portion of a lamp body according to an embodiment of the invention.

In addition, apart from this, in this invention, a configuration shown in FIG. 9 can also be adopted. FIG. 9 is a sectional view showing an outer circumferential edge portion of a lamp body 11 according to an embodiment of the invention. As shown in the figure, an outer circumferential edge portion 131 of a lamp body 11 includes a bottom wall portion 132 that projects outwards from a main body portion 32 of the lamp body 11 and a side wall portion 133 that rises upwards from a distal end of the bottom wall portion 132. A space defined between an outer circumferential surface of the main body portion 32 of the lamp body 11 and the side wall portion 133 is formed as a groove portion 134 where a leg portion 41 of a lens member 12 is received. Further, a portion of the groove portion 134 that lies to face the bottom wall portion 132 is formed as a narrow portion 137 whose width is narrower than that of a wide portion 136 the continues to an upper opening 135 of the groove portion 134. Additionally, thickness dimensions T of the bottom wall portion 132 and the side wall portion 133 are the same as a thickness dimension T of the lamp body 11. Because of this, the side wall portion 133 is formed curvilinearly from the wide portion 136 to the narrow portion 137. By adopting the configuration shown in FIG. 9, too, the same advantage as those provided by the embodiments described above can be obtained. Further, since the thickness dimensions T of the bottom wall portion 132 and the side wall portion 133 are made constant, the failures claimed to be caused at the time of injection molding is made difficult to be caused.

In addition, other configurations than those disclosed in the embodiments described heretofore can further be adopted, and it is needless to say that a configuration resulting from an appropriate combination of the modified examples described above can also be adopted. Additionally, in the embodiments, while the vehicle lamp is described as being applied to the headlamp, in place of this application, the invention can also be applied to vehicle lamps including a vehicle marker lamp, a rear combination lamp, a fog lamp and the like.

This patent application is based on Japanese Patent Application (No. 2012-88527) filed on Apr. 9, 2012, the contents of which are incorporated herein by reference.

INDUSTRIAL APPLICABILITY

According to the invention, the vehicle lamp can be provided that is easy to be assembled and that can restrict the amount of sealing material used to thereby reduce the production cost.

DESCRIPTION OF REFERENCE NUMERALS AND CHARACTERS

10: vehicle lamp; 11: lamp body; 12: lens member; 31, 107, 134: groove portion; 35, 108, 135: opening; 41: leg portion; 42: sealing material; 51, 111, 137: narrow portion; 52, 110, 136: wide portion; 53, 112: inclined portion; D: groove depth; G: gap.

The invention claimed is:

1. A vehicle lamp comprising:
a lamp body in which a groove portion is formed;
a sealing material
a lens member; and
a leg portion provided on the lens member, wherein the leg portion is inserted into the groove portion to thereby fix the lamp body and the lens member together via the sealing material, wherein a narrow portion is provided at a bottom side of the groove portion and a wide portion is provided at an opening side of the groove portion, and wherein a gap between the leg portion and a surface of the wide portion is wider than a gap between the leg portion and a surface of the narrow portion
  wherein the narrow portion and the wide portion are connected by an inclined portion that is inclined so as to reduce a width of the groove portion from the wide portion towards the narrow portion,
  wherein the sealing material is filled in the gap between the narrow portion and the leg portion, and is also filled in a part of a gap between the wide portion and the leg portion or a part of a gap between the inclined portion and the leg portion.

2. The vehicle lamp according to claim 1, wherein the sealing material is a moisture-curable adhesive.

3. The vehicle lamp according to claim 2, wherein a groove depth at the narrow portion is 3 mm or larger, and wherein a gap between the leg portion and the narrow portion is 0.1 mm or larger and 2.0 mm or smaller.

4. The vehicle lamp according to claim 1, wherein a groove depth at the narrow portion is 3 mm or larger, and wherein a gap between the leg portion and the narrow portion is 0.1 mm or larger and 2.0 mm or smaller.

5. The vehicle lamp according to claim 1, wherein a side wall of the wide portion extends linearly along a first discrete length of a depth of the groove portion, wherein a side wall of the of the narrow portion extends linearly along a second discrete length of the depth of the groove portion.

6. The vehicle lamp according to claim 5 wherein a side wall of the inclined portion extends angularly along a third discrete length of the depth of the groove portion so as to reduce the width of the groove portion from the wide portion towards the narrow portion.

7. The vehicle lamp according to claim 1, wherein a first side wall of the narrow portion extends linearly along a first length of a depth of the groove portion, wherein a second side wall of the of the narrow portion extends linearly along a second discrete length of the depth of the groove portion, wherein the first discrete length and the second discrete lengths are different lengths.

8. The vehicle lamp according to claim 7, wherein the first side wall of the narrow portion and the second side wall of the narrow portion are disposed on opposing sides of the leg portion.

* * * * *